Nov. 6, 1923.
S. W. NICHOLSON
1,473,310
WINDOW STRIP FOR VEHICLE WINDOWS
Filed April 3, 1922
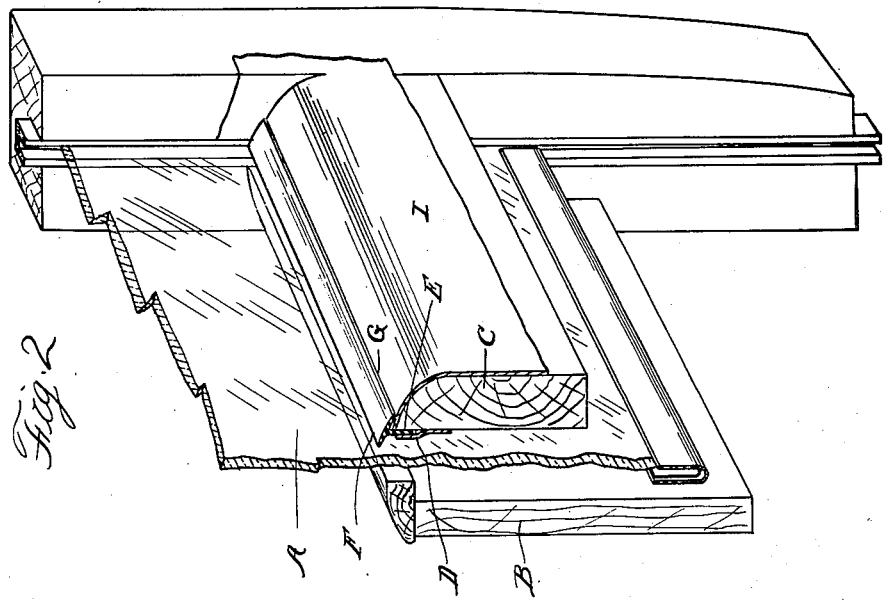
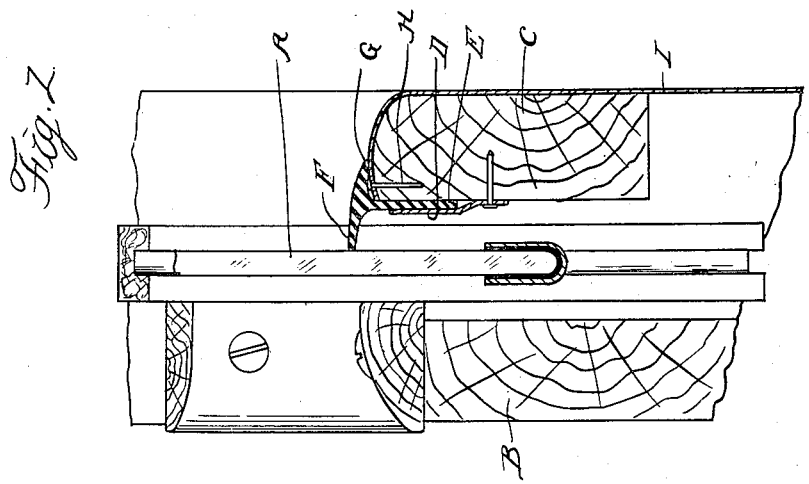
Inventor
Stanley W. Nicholson
Attorneys Patented Nov. 6, 1923.

1,473,310

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW STRIP FOR VEHICLE WINDOWS.

Application filed April 3, 1922. Serial No. 548,892.

*To all whom it may concern:*

Be it known that I, STANLEY W. NICHOLSON, a citizen of the United States of America, residing at Toledo, in the county of Lucas and State of Ohio, have invented certain new and useful Improvements in Window Strips for Vehicle Windows, of which the following is a specification, reference being had therein to the accompanying drawings.

This invention relates to weather strips and particularly relates to a weather sealing strip for exterior engagement with a vehicle window.

It is the object of the invention to provide a yieldable sealing strip adapted to be mounted for constant exterior contact with a sliding vehicle window member to exclude rain and dust and air currents from the well which receives said window member in lowered position.

In the drawings:—

Figure 1 is a cross sectional view of a vehicle window equipped with the improved sealing strip;

Figure 2 is a perspective view of the same.

In these views the reference character A designates a vertically slidable glass plate forming the closure element of a window, said plate being movable between interior and exterior sill members, B and C respectively. To the face of the sill member C which opposes the glass A there is secured a sheet metal retainer strip D which clamps against said sill member, a stem portion E of a T-shaped weather sealing strip extending the full width of the glass A. Said strip is formed of a suitable resilient material, preferably rubber, one of its top flanges F bearing upon the plate A and the other G overlapping the top face of the sill member C. Thus the portions F and G of said weather strip form a water shed and the latter portion provides a finish covering for the nails H which secure the panel strip I to the sill member C.

The described construction is one maintaining a constant contact between the weather strip E and the glass A, not only in the closed position but in any position of adjustment of said glass plate, dust, dirt, air currents and moisture thus being kept out of the well below the sill members B and C when the window is in open or partially open position, as well as when closed. The pressure of said sealing strip against the glass while sufficient to establish the desired seal is inadequate to add material resistance to sliding adjustment of the window member.

What I claim as my invention is:—

1. The combination with a vertically slidable window closure, of a sill member extending exteriorly of said closure, a weather strip formed of resilient material having a supporting portion engaging a face of said sill member opposing said sliding closure, and having an upper closure engaging portion, and means secured to said sill member clamping said supporting portion of the weather strip against said face.

2. The combination with a vertically sliding window closure and a sill member extending exteriorly of said closure, of a weather strip formed of resilient material of substantially T-shaped cross section, said strip having a supporting stem portion and opposed flange portions, said flange portions respectively bearing upon said closure and overlapping said sill member.

3. The combination with a vertically sliding window member, of a sill member extending exteriorly thereof, a panel sheet engaging said sill member, securing elements for said panel sheet entering said sill member and a resilient weather strip mounted upon said sill member having constant contact with said closure and having a water shed portion extending upon the top face of said sill member and covering said securing elements.

4. The combination with a sliding closure and a frame member extending adjacent said closure, of a weather strip formed of resilient material having oppositely projecting portions for respectively bearing upon said closure and overlapping a face of said frame member within the window opening, said strip further having a portion secured to a face of said frame member opposing the sliding closure.

5. The combination with a sliding window closure and a frame having an opening controlled by said closure and having a member extending at one end of said opening adjacent said closure, of a substantially T-shaped weather strip having oppositely projecting portions respectively bearing upon said closure and overlapping said frame member within the window opening and having a stem portion secured to a face of said frame member opposing the sliding closure.

In testimony whereof I affix my signature.

STANLEY W. NICHOLSON.